United States Patent [19]

Horne et al.

[11] Patent Number: 5,665,427

[45] Date of Patent: Sep. 9, 1997

[54] PROCESS FOR STABILIZING PARTICULATE ALKALI METAL PERCARBONATE

[75] Inventors: Graham Robert Horne, Warrington; Alun Pryce James, Liverpool, both of United Kingdom

[73] Assignee: Solvay Interox Limited, Warrington, England

[21] Appl. No.: 647,938

[22] PCT Filed: Dec. 21, 1994

[86] PCT No.: PCT/GB94/02776

§ 371 Date: May 30, 1996

§ 102(e) Date: May 30, 1996

[87] PCT Pub. No.: WO95/18065

PCT Pub. Date: Jul. 6, 1995

[30] Foreign Application Priority Data

Dec. 29, 1993 [GB] United Kingdom ............... 9326522

[51] Int. Cl.$^6$ .................... B05D 7/00; C01B 31/24
[52] U.S. Cl. .................... 427/212; 427/213; 427/215; 423/415.2; 510/375; 510/108; 510/441; 510/442; 510/509; 510/510; 510/511; 252/186.26
[58] Field of Search .................. 427/213, 212, 427/215; 423/415.2; 510/375, 108, 441, 442, 509, 510, 511; 252/186.26

[56] References Cited

U.S. PATENT DOCUMENTS

| | | | |
|---|---|---|---|
| 5,219,549 | 6/1993 | Onda et al. | 423/415 |
| 5,332,518 | 7/1994 | Kuroda et al. | 252/99 |
| 5,366,655 | 11/1994 | Yamashita et al. | 252/186.27 |

*Primary Examiner*—Shrive Beck
*Assistant Examiner*—Bret Chen
*Attorney, Agent, or Firm*—Larson and Taylor

[57] ABSTRACT

The invention relates to a process for stabilizing particulate alkali metal percarbonate by coating by coating it with an aqueous solution, preferably concentrated, of a complex formed from a boric acid or borate and an organic diol, polyol or hydroxycarboxylic acid, to the resulting coated product, and to compositions including the product. The coating can additionally contain an alkali metal neutral salt such as sodium chloride or sodium sulphate.

42 Claims, No Drawings

1

PROCESS FOR STABILIZING PARTICULATE ALKALI METAL PERCARBONATE

BACKGROUND OF THE INVENTION

The present invention relates to a process for stabilising particulate alkali metal percarbonate, and particularly to a coating process therefor, to the particulate percarbonate having improved stability so produced and to washing or bleaching compositions containing the same.

It is well known that alkali metal percarbonates, including sodium percarbonate in particular, can be used as bleaching compounds in detergent powder mixtures, e.g. for domestic clothes washing. In comparison with alkali metal perborate tetrahydrate, they have the advantage of dissolving more rapidly at 20° C., which is becoming increasingly beneficial in view of the trend towards lower washing temperatures. Another advantage of percarbonates is that they are environmentally friendly. However, percarbonates have a known disadvantage of decomposing more quickly than sodium perborate tetrahydrate during storage in the powdered state, particularly if stored in a damp atmosphere. Moreover, other constituents of washing compositions can accelerate their decomposition.

In order to improve the stability of percarbonates, and particularly sodium percarbonate, it has been proposed to bring the percarbonate particles into contact with various stabilising materials, and in particular to coat the percarbonate with those materials. Organic and/or polymer compounds such as paraffins, polyols, vinyl resins etc. and inorganic compounds such as silicates, borates, perborates, boric acids etc. have been proposed as coating materials.

A French patent to Kao Corporation published under number 2 528 447 describes coating the surface of sodium percarbonate with sodium borate. A process for coating sodium percarbonate consists of wetting the sodium percarbonate with water, mixing the damp sodium percarbonate with sodium borate in powder form and then drying them at a temperature above the melting temperature of the sodium borate used. This process requires a substantial amount of energy because of the high temperature required to melt sodium borates. In addition, the fact that the sodium percarbonate is wetted requires strict control of its water content to prevent or minimise decomposition.

In British patent 1 575 792, to Interox SA there is described a process for stabilising sodium percarbonate by coating it with a solution of a boric acid. We have found that coatings with boric acid can be very effective at stabilising percarbonate, but the solubility of boric acids in water is somewhat limited, particularly at ambient temperatures. In consequence, it is necessary to use rather larger volumes of coating solution than for more soluble coating materials, which is disadvantageous because it would be desirable to find a way of increasing the solubility. Such low concentrations are disadvantageous for industrial use, because more thermal energy is needed to dry the percarbonate particles after coating, thereby increasing the drying costs, and the prolonged drying periods can cause percarbonate decomposition, reducing the value of the eventual product.

It is an object of the present invention to provide a process for stabilising percarbonate particles which ameliorates or overcomes at least some of the disadvantages of the above-mentioned processes and/or provides an alternative to the above-described processes,

BRIEF SUMMARY OF THE INVENTION

The present invention provides a process for stabilising a particulate alkali metal percarbonate by coating it with an effective amount of a boric acid or borate containing coating material, characterised in that the coating material comprises a complex of boric acid or a borate with an organic diol polyol or hydroxycarboxylic acid.

DESCRIPTION OF PREFERRED EMBODIMENTS

Herein by the term effective amount is meant an amount such that the rate of decomposition of percarbonate is reduced, when it is stored in an atmosphere at 80% relative humidity and 40° C. in the presence of 10% w/w zeolite 4A.

Without being bound by any theory, it is believed that the effectiveness of coatings obtained in the present process may be attributable to the nature of the complexes of the boric acid and/or borate with the di or polyol on the surface of the percarbonate, enabling them to spread across the surface of the percarbonate and thereby form a barrier that prevents or reduces interaction between the percarbonate core and the environment, be it water vapour in the atmosphere and/or other particulate materials in for example detergent compositions in which percarbonate is incorporated as a bleach.

The coating solutions of the present invention can be obtained by introduction of preformed complexes between the oxyboron compound and the diol, polyol or hydroxycarboxylic acid or by the introduction of both components into the coating solution enabling the complex to form in situ. The complexes of the present invention can contain or be derived from any boric acid or alkali borate. The precise nature of the oxy-boron species in solution prior to the formation of complexes will depend on the pH of that solution and the extent to which the solution is able to equilibrate. Suitable boric acids for introduction into the coating solution include ortho and metaboric acids and suitable borates that can be introduced into solution include martials containing trigonal $BO_3$ or tetrahedral $BO_4$ groups or both arranged in either ring anions or chain anions. In solution, the borate species are or become hydrated. Expressed empirically, useable borates include those of formula $MB_5O_8$ and $M_2B_4O_7$ and $M_3B_3O_6$, in which M represents an alkali metal or ammonium ion, and preferably either sodium or potassium, such borates typically being hydrated in solution. Viable borates include, metaborate, tetraborate, pentaborate and octaborate, typically hydrated at the time of of after introduction into solution. Also, there may be contemplated use of a perborate of empirical formula $M_2B_2O_6.nH_2O$ in the coating solution to supply at least a fraction of the borate. In many instances, a single boron compound is introduced into the coating solution, though mixtures may be used, and indeed in the coating solution, a range of oxyboron species is often generated.

The second essential component of the coating complex comprises a diol, polyol or hydroxycarboxylic acid. Such compounds are characterised by the presence of at least two groups within the second component that are capable of complexing with boron at the same time, ie the component is a bidentate or polydentate ligand, at least one of which groups is an hydroxyl group and the other or others may be either hydroxyl or carboxylic acid groups. The alcohols that can form complexes herein can be either aliphatic (including alicyclic) or aromatic, and the hydroxycarboxylic acids are normally aliphatic. It will be understood that the hydroxy-containing complexing compounds may be monomeric or alternatively can be polymeric provided that such polymers retain pendant hydroxyl and where appropriate carboxylic acid groups. It will be further recognised that where the complexing compound is liquid at ambient temperatures, it is preferable to employ an excess of the boric acid or borate above the stoichiometric amount to complex with the organic complexing compound, so as to avoid the presence of any liquid agent of the percarbonate surface.

The complexing compounds can suitably be selected from the following classes of compound:

aliphatic and alicyclic polyhydric alcohols;
sugars and alcohols derived therefrom;
oligosaccharides and polysaccharides;
aromatic polyols;
aliphatic hydroxy carboxylic acids as such or as a salt, vitamins and enzymes;
Aliphatic polymers with pendant hydroxyl and carboxylic acid groups.

It will be recognised that there is some degree of overlap between certain of the classes above, as for example between polyols and sugar derivatives and between aliphatic hydroxycarboxylic acids and the vitamin/enzyme classes and some examples of the one class are also examples of the other class as well. A mixture of two or more diols, polyols or hydroxycarboxylic acids may be employed, selected either from the same class or from different classes listed above.

Examples of compounds in the classes are as follows:

aliphatic and alicyclic polyhydric alcohols such as pentaerythitol, and sugars and alcohols derived therefrom include galactose, fructose, xylose, mannitol and sorbitol;

oligosaccharides and polysaccharides include mannan, galactomannan and β lactose;

aromatic polyols include naphthol, gallic acid and dihydroxybenzoic acid;

aliphatic hydroxy carboxylic acids or salts, preferably water-soluble, such as ammonium or particularly an alkali metal, especially sodium salt, include citric acid, tartaric acid, gluconic acid, saccharic acid and lactobionic acid and sodium salts thereof.

Vitamim and enzymes include acsorbic acid and riboflavin; Polymers include polyvinylalcohol and polyhydroxyacrylic acid or the soluble eg sodium salt thereof, known as PHAS, each preferably having an average molecular weight in the range of 30,000 to 200,000;

The proportion of boron compound in the complex is generally from 10 to 90% by weight calculated as $H_3BO_3$, based on the total weight of the complex, is often at least 20% w/w and in many instances is from 50% to 80% by weight of the complex. The diol, polyol or hydroxycarboxlic acid constitutes the balance of the complex.

Various of the complexes employed in the present invention and their formation can be represented as follows, where L represents a bidentate ligand such as tartrate:

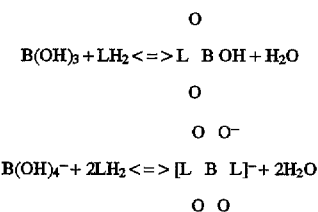

As it can be seen, in the resultant complexes, the ligand is bonded via two oxygen bridges to the boron and the compound is no longer either a boric acid or a borate.

The coating agent of the present invention is advantageously employed in the form of an aqueous solution. In practice, the concentration of the coating complex, ie the total of boron compound and diol, polyol or hydroxycarboxlic acid, in the aqueous coating solution is at least half of, and preferably as close as is convenient to, its saturation concentration of the solution at the application temperature. In this way, only a comparatively small and preferably the smallest practicable quantity of water needs to be evaporated subsequently to produce dry percarbonate particles, thereby requiring a lesser or least heat input. It will be recognised that the invention complex has a significant higher solubility than boric acid. The concentration of coating agent in the aqueous coating solution is generally at least 15% by weight, preferably at least 20% by weight. Concentrations above or equal to approximately 25% by weight are particularly advantageous.

The dissolution of the complex or its components can take place conveniently at a temperature of from 15° to 95° C., and preferably from 20° to 70° C.

In addition to the foregoing essential components of the complex, the coating agent may contain a proportion of one or more compounds that are known to ameliorate decomposition of percarbonates when employed as a coating, or possibly as a mixture with percarbonates. It will be recognised that where such optional components are employed in the percarbonate coating, they may be employed in a separate coating, for example a second solution added before, simultaneously with or after the solution of the borocomplex of the present invention.

Among the optional components, specific mention is made of those materials which have hitherto been suggested as stabilising coatings for percarbonate or for other persalts, including particularly silicates, phosphates, and chelating agents selected from metal polycarboxylic acids and polyphosphonic acids. Such materials may be employed as the sole optional component or mixtures of optional components can be used.

Such silicates are often selected from alkali metal silicates having a mole ratio of soda:silica of from 2:1 to 1:4 and in accordance with the disclosure in co-pending British Patent Application 9226796 the amount of silicate and the soda::silica ratio are selected in conjuction with other materials employed in the same aqueous solution such that in use the solution does not gel. Such phosphates can be ortho, meta or polyphosphates and are often in alkali metal salt form, e.g. sodium or potassium, including both fully and partially neutralised salts. Such chelating agents that are suitable optional components herein often comprise aminopolyalkylcarboxylic acids and/or aminopolyalkylenephosphonic acids which obey the formula

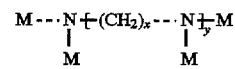

in which M represents either —$CH_2$—$CO_2H$ or —$CH_2$—$PO_3H$, x represents an integer selected from 1 to 6, and preferably is 2, and y represents an integer selected from 0, 1, 2 or 3. Within this general formula especially preferred stabilisers include ethylenediamine tetra acetic acid (EDTA), ethylenediamine tetrakis (methylenephosphonic acid) (EDTMP), and diethylenetriamine pentakis (methylenephosphonic acid) (DTPMP). An alternative and highly effective complexing agent comprises cyclohexane-1,2-tetramethylene phosphonic acid.

The amount of the optional components is often at the discretion of the user. A convenient amount to employ of the above optional component or in total of the optional components is sometimes in the range of from about 0.1% to about 10% w/w of the percarbonate, in many instances less than 5% w/w and in certain instances from about 0.25 to about 2% w/w.

In addition to the borocomplex, it is possible as an option to include in the coating agent solution one or more neutral alkali metal or ammonium salts, and in particular a halide such as chloride, and/or sulphate and/or nitrate salts. In a number of attractive coatings, the neutral salt comprises a mixture of a sulphate and a chloride. Preferably, the alkali metal is either sodium and/or potassium, but may comprise any of the other alkali metals such as lithium. Particularly desirable neutral salts include sodium chloride, potassium chloride, sodium sulphate and potassium sulphate and any two or more in mixture. If present, the neutral salt provides the benefit of increasing the thickness of coating on the percarbonate particles for a specified amount of boron-containing compound, and by virtue of the solubility of the salts, can often enable such a thicker coating to be achieved without increasing the volume of water that needs subsequently to be evaporated away in the drying stage, or at least not increasing the volume of such water pro rata.

In mixtures containing the borocomplex and the neutral salt, the borocomplex often provides at least 20% w/w of the mixture and in a number of attractive mixtures from 30 to 70% w/w of the mixture. However, the proportion of borocomplex chosen usually also takes into account the total weight of coating applied to the percarbonate and the preferred minimum weight of borocomplex in the coating, as indicated subsequently herein. The borocomplex for use in the mixture can be chosen at the discretion of the user from any of the borocomplexes disclosed hereinbefore.

In a number of preferred embodiments, the proportion of the organic constituent of the complex is less than 45% by weight of the entire coating, including both the complex and the neutral alkali metal salt, if present, and particularly from 10 to 30%.

In yet further options, the user can contemplate the incorporation of a neutral alkaline earth metal salt such as a magnesium or calcium sulphate and/or chloride, preferably in a minor proportion and often from 0 to 20% w/w of the mixture with borocomplex, because the presence of such alkaline earth metal salts can tend to depress the solubility of boron compounds in aqueous solution.

The quantity of coating agent used, including both essential components and optional components, usually represents 0.5 to 20% w/w of the coated percarbonate. Preferably, the quantity is selected in the range of from 1 to 15% w/w and in many instances from 2 to 10% of the coated percarbonate. As a general indication, when a coating is applied in the same way, the extent to which percarbonate decomposition is ameliorated increases as the thickness of the coat increases, though non-linearly. The selected weight of coating takes into account the manner of coating, the length of the period for which the resultant composition should remain stable and the environment in which the percarbonate will be used, such as the temperature and humidity of storage conditions and the proportion of relatively aggressive washing composition constituents like zeolites.

In some embodiments, the percarbonate particles are coated with a relatively small quantity of coating agent, such as from about 2% w/w to about 6% w/w, which ensures that the percarbonate particles initially can enjoy a high active oxygen content, which is maintained by the coating. In a number of such embodiments, the weight of boric acid applied is often in the region of about 0.5 to 1% w/w, the weight of organic component in the complex is often from about 0.4 to about 0.8% w/w and the weight of neutral salt such as sodium chloride is often from about 1 to 2.5%.

The alkali metal percarbonate is preferably sodium percarbonate. In many of the coated percarbonate products produced according to the present invention, the bulk density of the percarbonate so coated is generally 0.8 to 1.2 kg/l. The rate of dissolution of percarbonate that has been so coated is often acceptably rapid, when determined according to international standard ISO 3123-1976. The time corresponding to a 90% dissolution of the sample of percarbonate coated according to the invention does generally not exceed 2.5 minutes.

The particulate percarbonate that is suitable for coating in any process according to the present invention can have been prepared in any process known as such for making an alkali metal percarbonate, e.g. by the direct method, by fluid bed processes, or the so-called wet processes in which percarbonate is crystallised from a saturated aqueous solutions, often by cooling and/or by addition of an alkali metal salt.

The percarbonate core particles which are coated according by a process to the present invention can incorporate various additives in a wide range of proportions and in accordance with known teachings and/or practice. Such additives include, amongst others, persalt stabilisers, crystal habit modifiers and salting out agents.

Persalt stabilisers can be selected from one or more of alkali metal and alkaline earth metal silicates, alkali metal and alkaline earth phosphates, magnesium compounds such as magnesium sulphate, chloride or oxide, organic complexing carboxylic acids and their salts, such as ethylene diamine tetraacetic acid and/or salt, or diethylenetriaminepentaacetic acid and/or salt and/or organic polyphosphonate complexing agents such as hydroxyethylidenediphosphonate, and alkyleneaminopolymethylenephosphonates, including ethylenediaminetetramethylenephosphonic acid and/or salt, diethylenetriaminepentamethylenephosphonic acid and/or salt cyclohexane-1,2-diaminetetramethylenephosphonic acid and/or salt.

In some highly desirable embodiments, the process of the present invention is employed to coat sodium percarbonate that has been produced by a manufacturing/stabilising process described either in GB-A-1 553 505, published in the name of Interox Chemicals Limited or in GB-A-1 578 062, published in the name of Peroxid-Chemie GmbH, in both of which the percarbonate contains a small amount of up to about 0.5% w/w silicate distributed within its particles and a further small amount of up to about 0.5% of a silicate or silicate derivative on the surface of its particles, as a result of the timing and distribution of the addition of silicate in two stages during the crystallisation and recovery of the particulate percarbonate.

Crystal habit modifiers act on the morphology of the percarbonate crystals and include organic polymeric compounds like polyacrylates and inorganic species such as polyphosphates e.g. sodium hexametaphosphate.

Salting out agents are used during the crystallisation of the percarbonate from solution, and typically are highly water-soluble alkali metal salts, such as sodium chloride, sodium sulphate, sodium hexametaphosphate etc.

It will be understood that some agents can simultaneously provide a number of different properties, such as stabilisation and crystal habit modification.

The average diameter of the percarbonate core particles that can be coated by a process according to the present invention is generally at least 100 μm and often not greater than 2000 μm, and in many instances, the average particle size falls in the range of 250 to 1000 μm, such as commercially available percarbonate having an average particle size of about 500 μm or about 550 μm. The spread of percarbonate particles is at the discretion of the percarbonate producer. As a practical matter, and as has been realised for many years, it is advantageous for incorporation in particulate detergent compositions to avoid very fine particles, such as particles of below about 100 or 150 μm, because such particles are inherently more susceptible to environment-induced decomposition—they present a much higher surface area to volume ratio than larger particles. For many particulate detergent compositions, it is also desirable to avoid or minimise particles larger than about 1500 μm, to reduce potential problems of persalt/detergent particle segregation. Thus, in many practical embodiments of the present invention all or substantially all the percarbonate to be coated can pass through a sieve of 1500 μm and be retained on a sieve of 150 μm, and in some of which or other embodiments at least 80% w/w is retained on a sieve of 350 μm and passes through a sieve of 1000 μm.

The process according to the present invention by which percarbonate particles are coated with the coating agent described above can comprise any method known in itself for contacting persalts with coating agent. A preferred means for bringing the coating agent into contact with the percarbonate comprises spraying an aqueous solution of the coating agent onto the percarbonate particles. It is particularly desirable for the percarbonate particles to be kept in motion. Thus, a coating process of the present invention can desirably be carried out in a range of apparatuses that can agitate particles, of which practical examples include a fluid bed, a rotating plate, and a rotary mixer into each of which it is convenient to spray the coating agent solution. During the course of the contact, the persalt tends to adsorb, and to some extent absorb the coating agent solution and with subsequent or simultaneous evaporation of the solvent from the coating agent solution, a coating is deposited around the percarbonate core.

It will be recognised that the invention coating process may be conducted in a single pass through the coating apparatus or in a plurality of passes, at the discretion of the user. A plurality of passes is particularly beneficial for application of a heavy coating in that it reduces the amount of solvent that need be removed in each pass and thus reduces or removes the risk of over-wetting the percarbonate before it is dried. A continuous or batch method can be used.

Evaporation of solvent from the solution can be carried out at the same time and in the same vessel as spraying. The two steps can alternatively be carried out separately in different apparatus, which may in some cases be of the same type, e.g. both in fluidised beds or be of different types, such as the mixing step in a rotary mixer and the evaporation step in a fluidised bed piece of equipment.

An apparatus such as a fluid bed is particularly suitable for carrying out simultaneous spraying and evaporation. In such a case, the temperature of the fluid bed is usually maintained in the range of 30° to 95° C. and preferably 60° to 80° C.

One particularly advantageous process variation comprises contacting a charge of the percarbonate particles with a solution of the invention coating agent in a separate mixer, particularly a rotary mixer, and drying the wetted percarbonate subsequently in a fluid bed. The solution can be introduced into the mixer by spraying or even via a coarse spray such as one or more nozzles. In this separate mixer variation, the temperature in the mixer is often selected in the range of 10° to 60° C. and preferably 20° to 50° C. Drying in the fluid bed is then often carried out at a temperature of 50° to 90° C. and preferably of from 60° to 70° C.

The fluid bed employed herein either for a combined coating/drying process or simply in the drying stage can be operated in accordance with known procedures for coating/drying or simply drying persalts, as the case may be. Thus, any non-reactive gas can be used as the fluidising gas, including air in particular. The gas can be pre-dehumidified, if desired, and pre-heated to maintain the temperature of the fluid bed at the desired value. It is also possible to use direct heating means for the fluidised bed, such as a tube bundle placed within the fluid bed or a heated jacket around the bed. The upward airflow of fluidising gas is regulated to maintain the percarbonate particles in an agitated state, ie not settling, but is not so great as to blow the particles, other than fines, out of the fluidising vessel.

The aqueous coating solution is generally brought into contact with the percarbonate particles at a temperature that is within about 30° C. of the particles and often within about 5° C. of each other.

The proportions of coating agent solution and percarbonate are chosen so as to leave, after drying, the desired weight of coating agent around the percarbonate core. In practice, it is desirable to limit the addition of solution to percarbonate in a fluid bed or mixer to a maximum water content of about 18% w/w so as to minimise or eliminate wetting out problems, more preferably to an amount selected in the range of about 5 to 12% w/w water and often from about 8 to 12% w/w water. It is normally desirable also to continue drying until the coated percarbonate has a moisture content of below about 1% w/w, such as in the region of 0.1 to 0.7% w/w. The duration of the drying stage is usually determined by such practical considerations as, amongst others, the amount of coating agent solution being applied per unit weight of percarbonate, the residual content of moisture that will be tolerated, the temperature and moisture content of the influent fluidising gas, whether additional heating is employed for the bed and the rate at which the gas flows through the bed. It will accordingly vary from apparatus to apparatus and be capable of control by a skilled person in the art of coating persalts with the aid of preliminary ranging trials.

It will naturally be recognised that the final form of a coating agent on percarbonate may change as a result of subsequent reaction or processing. Thus, for example, contact of a solution of an acidic coating agent on the surface or in the surface layer of percarbonate, an alkali, as in the aforementioned British Patent Specification 1 575 792, may result in the interaction of the acid with the alkali, and that the drying stage can release water of hydration from some or all hydrated salts that might be expected to be present at ambient temperature, provided that the drying temperature exceeds the transition temperature for such salts.

The present invention also relates to washing or bleaching compositions containing particulate coated sodium percarbonate, such as product according to the present invention described hereinabove and/or produced by the process according to the present invention hereinabove.

In many preferred compositions according to the present invention, one or more of the composition components are selected within the following narrower bands:

| percarbonate | 2 to 40%, particularly 5 to 30% |
| surfactant | 2 to 40%, particularly 5 to 25% |
| builder | 1 to 60%, particularly 5 to 40% |
| diluent | 1 to 70%, particularly 5 to 50% |
| additives | 1 to 10% in total. |

The surfactants for incorporation in solid compositions of the present invention can be selected from particulate or flaky anionic, cationic, non-ionic, zwitterionic, amphoteric and ampholytic surfactants and can be either natural soaps or synthetic. A number of suitable surfactants are described in chapter 2 of Synthetic Detergents by A. Davidsohn and B. M. Milwidsky (6th edition) published in 1978 by George Godwin Ltd and John Wiley & Sons, incorporated herein by reference. Without limiting to these surfactants, representative sub-classes of anionic surfactants are carboxylic acid soaps, alkyl aryl sulphonates, olefin sulphonates, linear alkane sulphonates, hydroxy-alkane sulphonates, long chain and OXO alcohol sulphates, sulphated glycerides, sulphated ethers, sulpho-succinates, alkane sulphonates, phosphate esters, sucrose esters and anionic fluorosurfactants; representative classes of cationic surfactants include quaternary ammonium or quaternary pyridinium salts containing at least one hydrophobic alkyl or aralkyl group, representative classes of nonionic surfactants include condensates of a long chain alkanol with either polyethylene oxides or with phenols, or condensates of long chain carboxylic acids or amines or amides with polyethylene oxide, and related compounds in which the long chain moiety is condensed with an aliphatic polyol such as sorbitol or condensation products of ethylene and propylene oxides or fatty acid alkanolamides and fatty acid amine oxides; representative classes of amphoteric/zwitterionic surfactants include sulphonium and phophonium surfactants, optionally substituted by an anionic solubilising group. The proportion of surfactant, expressed as a fraction of all the surfactant present is often from $2/10$ to $9/10$ths anionic, from 0 to $6/10$ths nonionic, and from 0 to $3/10$ths for the other surfactants.

Detergent builders that are suitable for inclusion in compositions according to the present invention include specifically alkali metal phosphates, particularly tripolyphosphate but also tetrapyrophosphate and hexametaphosphate, especially the sodium salt of each, alkali metal, preferably, sodium carbonate, alkali metal, preferably, sodium borates, and siliceous builders including clays like bentonite, zeolites such as X, Y and MAP zeolites (EP-A-0 552 053) and layered silicates such as the product available under the trade designation SKS6. The coatings achievable with the boric acid-containing agents of the present invention render sodium percarbonate that has been so coated at higher levels particularly suited to incorporation in the relative aggressive detergent compositions, ie those containing siliceous builders. Useful detergent compositions can also include organic chelating builders include nitrilotrisodium triacetate (NTA), EDTA, EDTMP and DTPMP, Such chelating builders can be employed in a relatively small amount as an augmenting builder and peroxygen stabiliser, such as of 1 to 10%.

The detergent compositions can also contain diluents, in an amount usually of not more than about 50% w/w. Such diluents include sodium and magnesium sulphate and are less favoured than previously by manufacturers of detergent compositions, who in recent years have promoted concentrated compositions.

Detergent compositions of the present invention can also contain other substances selected for dedicated purposes in detergent compositions, which in some instances are referred to collectively as detergent additives. Among such additives, the following can be mentioned: persalt activators, optical brighteners, foam inhibitors, enzymes, fading inhibitors and anti-redeposition agents, colorants, pH regulators. Such additives for incorporation in persalt-containing detergent compositions have been described in greater detail in Chapter 4 and exemplified in Chapter 7 of the aforementioned work by Davidsohn and Mildwidsky and are well known to skilled practitioners. Thus, for example, the bleach activator is typically a compound which generates a peroxyacid or an anion thereof by reaction with the percarbonate and is employed in a mole ratio of about 4:1 to 1:2 percarbonate:activator for monoactivating activators and proportionately for multiactivating activators. The range of activators a1 to a20 described by Solvay Interox Ltd in EP-A 0 565 017 can be employed herein, including TAED, SNOBS, sodium isononoyloxybenzenesulphonate, TAGU or sugar esters. Another type of activator for washing/ bleaching compositions comprises certain transition metal salts and/or complexes, for example certain manganese, cobalt, and titanium complexes, sometimes employed in conjunction with a calcium promoter, as described in European Patent Application-A-0 272 030. Commonly used optical brighteners include stilbene derivatives. Commonly used optical brighteners include stilbene derivatives. Common antiredeposition agents include carboxymethyl cellulose and polyvinyl pyrrolidone.

The washing and/or bleaching compositions can be employed for washing and or bleaching operations, such as for domestic laundry in accordance with currently described operation conditions for respectively persalt or persalt plus activator-containing compositions.

Although described herein with reference to alkali metal percarbonates, the coating agents and coating solutions herein containing a borocomplex can likewise be contemplated in a modification of the present invention for use with and to stabilise other peroxygen compounds which could benefit from enhanced stability, for example if they being considered for incorporation in particulate detergent compositions. Such peroxygen compounds include other persalts (materials which generate hydrogen peroxide in aqueous solution), typically alkali metal and especially sodium salts, including especially persalts that are less stable than sodium perborate tetrahydrate, including perphosphates and persilicates.

Certain embodiments of the present invention are described hereinafter in greater detail by way of example only.

EXAMPLES 1–4 AND COMPARISONS
C5 AND C6

In each of these Examples, particulate sodium percarbonate (1 kg) (commercially available from Solvay Interox under its trade mark OXYPER and having a weight average particle size of 480 μm was coated with complexes formed from boric acid and hydroxycarboxylic acids.

A solution of a borocomplex coating agent in Example 1–3 was prepared by dissolving orthoboric acid, 150 g, and hydroxycarboxylic acid salt, 50 g, in demineralised water (DMW, 1 liter) and adjusted to pH7 at a temperature of about 20°–30° C. In Example 1, the salt comprised trisodium citrate, in Example 2, potassium D-saccharic acid and in Example 3, disodium tartrate.

The particulate sodium percarbonate was charged into a laboratory scale fluidised bed drier (available under the trade mark AEROMATIC), fluidised with hot air and heated to a bed temperature of 70° C. A fraction of the previously prepared coating solution, 263 mls, was sprayed onto the fluidised bed in a substantially constant manner over a period of 45 minutes. The bed continued to be fluidised for a further period of about 5 minutes to ensure that the coated percarbonate particles had been dried and the resultant material bore a coating of 5% w/w of the borocomplex.

In Example 4, the coating solution comprised 99.8 g of a solution of pH6 obtained by dissolving o-boric acid (25 g), PLAC (a polylactone) hydrolising to poly α hydroxyacrylate, (12.72 g, av mol wt of 170,000) and NaOH (7.28 g), providing a coating of 3% w/w on the percarbonate. The coating procedure comprised first pouring the coating solution onto a further 1 kg sample of the commercial particulate sodium percarbonate that was being agitated in a Logide M5R mixer, and thereafter drying the damp percarbonate for 45 minutes at a bed temperature of 70° C. in an AEROMATIC fluid bed drier.

In Comparison C5, the procedure of Examples 1–3 was followed, except that the coating solution comprised 100 g orthoboric acid in 1 liter of DMW that was heated to between 50° and 60° C. until the solute was dissolved of which 310 mls solution was sprayed into the bed to provide a dry weight coating of 3% w/w. In Comparison C6, C5 was followed, but using 526 mls of solution sprayed onto the fluidised bed over a period of 60 minutes to provide a dry weight coating of 5 % w/w. It was observed during repeat runs of C5 and C6 that the coating solution tended to block the sprayhead periodically unless remedial heating of the spray and periodic flushing was carried out.

The solubility and stability of the products of Examples 1–4 were tested using the procedures outlined below:
The rate of dissolution of the percarbonate was measured by International Standard method ISO 3123-1976. The proportion of percarbonate dissolving after 60 seconds is given.

The suitability of coated percarbonate for bulk storage was tested by measuring its heat output using an LKB isothermal microcalorimeter. The suitability of the coated percarbonate for incorporation with other ingredients in a washing or bleaching composition was determined by dry blending the coated sodium percarbonate particles (15% w/w) with a particulate detergent base composition (85%) which contained carbonate and Zeolite 4A builders, packing the resultantant blend in glass containers and storing them in controlled temperature and humidity conditions of 40° C. and 80% Relative Humidity, and measuring the available oxygen content of the composition at intervals to determine, by comparison with the original content, the proportion remaining. The same base detergent was employed for testing the products of Examples 1–3 and C5–C7, but a different and more aggressive base detergent (90% w/w)was employed to test the product of Example 4 (10% w/w).

The coated percarbonate was further compared with the uncoated feedstock percarbonate (C7).

The results of the tests are summarised in Table 1 below. For Ex 4, the % solubility is after 2 minutes and the Avox stability after 4 weeks is quoted and are differentiated in Table 1 by the presence of an *.

TABLE 1

| Ex. No | % Dissolved after 1 minute at 15° C. | Bulk storage suitability - LKB µW/g 40° C., 16 hr | Avox Stability % remaining after 6 weeks |
| --- | --- | --- | --- |
| 1 | 96 | 7.4 | 80 |
| 2 | 84 | 9.0 | 76 |
| 3 | 93 | 7.5 | 78 |
| 4 | 83* | 5.8 | 79* |
| C5 | 84 | 12.7 | 75 |
| C6 | 84 | 14.1 | 74 |
| C7 | 89 | 5.8 | 39 |

From Table 1, it can be seen that coated products according to the present invention had similar or better properties than either uncoated percarbonate feedstock or products coated with the corresponding boric acid by itself. In particular it will be observed that for two of the invention products the solubility of the coated product (Ex1 and Ex3) was actually superior to uncoated material (C7), and the Example coated products had a lower heat emission than the coated comparison products C5 and C6 indicating that they were safer to store in bulk before incorporation into a detergent composition. Thirdly, it will be recognised that all the coated products were markedly superior to the uncoated feedstock material. Moreover, the invention products were obtained using higher concentration solutions thereby requiring less evaporation of water from the coating solution, and without encountering the sprayhead blocking problems observed when the lower concentration comparison products were made.

EXAMPLES 1a TO 1i

The process of Example 1 can be repeated employing respectively sorbitol (1a), mannitol (1b), gluconic acid/Na or K salt (1c, 1d), lactobionic acid/Na or K salt (1e,1f) or the corresponding K salts of the salts employed in Ex1, Ex2 or Ex3 (1 g, 1h, 1i) instead of trisodium citrate of Ex1.

EXAMPLES 8 TO 13

In these Examples, the process of Example 4 was repeated at the 1 kg scale, using the coating solutions S1 to S4 as described in Table 2 below, gravity fed through a tube over 5 minutes onto the particulate percarbonate in the mixer, but employing a subsequent drying period in the fluidised bed of 30 minutes. In the solutions described in Table 2, the proportions of the constituents are given by weight. The extent of coating and the properties of the coated sodium percarbonate are shown in Table 3, in which the % dissolution, bulk storage and avox stability figures were obtained in the same way and under the same conditions as those quoted in Table 1.

TABLE 2

| Solution Ref | Boric acid | NaCl | Tartaric acid | Sodium Gluconate | Water |
| --- | --- | --- | --- | --- | --- |
| S1 | 2 | 3 | 1 | | 18 |
| S2 | 5 | 12 | 3 | | 60 |
| S3 | 3 | 8 | | 4 | 40 |
| S4 | 5 | 12 | | 3 | 60 |

TABLE 3

| Example No | Solution Ref | Amount g | % w/w coating w/w | % Dissolution 1 min | Bulk Storage µW/g | Avox left % 6 weeks |
| --- | --- | --- | --- | --- | --- | --- |
| 8 | S1 | 124 | 3 | 95 | 5.0 | 77 |
| 9 | S1 | 82 | 2 | 85 | 4.6 | 68 |
| 10 | S2 | 124 | 3 | 100 | 4.4 | 76 |
| 11 | S2 | 82 | 2 | 100 | 0.8 | 79 |
| 12 | S3 | 113 | 3 | 100 | — | 65 |
| 13 | S4 | 82 | 2 | 100 | — | 67 |

By way of comparison, the avox remaining in a sample of the uncoated feed stock sodium percarbonate after the same storage period and in the same base detergent composition was only 39%.

From Table 3, it can be seen that the coated products were substantially more storage stable in a detergent composition than was the feedstock material, and that the compositions containing tartaric acid within the complex were on average more stable than when the complex contained gluconate. An intermediate storage stability is obtained when a polyhydroxyacrylate is substituted in the same weight proportion for respectively the tartaric acid or sodium gluconate in the solutions identified above, though it tended to have a higher bulk heat emission than would be preferred.

We claim:

1. A process for stabilizing a particulate alkali metal percarbonate by coating it with an effective amount of boric acid or borate containing coating material, wherein the coating material comprises a complex of boric acid or a borate with an organic diol, a polyol, a hydroxycarboxylic acid, or a water soluble salt of a hydroxycarboxylic acid.

2. A process according to claim 1 wherein the alkali metal percarbonate comprises sodium percarbonate.

3. A process according to claim 1 wherein the complex is formed from a boric acid.

4. A process according to claim 3 wherein the complex is formed by dissolving boric acid and an hydroxycarboxylic acid and/or a soluble salt thereof in water at a temperature of from ambient to 60° C.

5. A process according to claim 1 wherein the complex is formed from borax.

6. A process according to claim 1 wherein the complex is formed from an aliphatic hydroxycarboxylic acid or soluble salt thereof.

7. A process according to claim 6 wherein the aliphatic hydroxycarboxylic acid or salt thereof employed to form the complex is selected from citric acid, tartaric acid, gluconic acid, saccharic acid and lactobionic acid and the alkali metal salts thereof.

8. A process according to claim 7 wherein the complex is formed from orthoboric acid and sodium citrate or sodium tartrate.

9. A process according to claim 1 wherein the complex contains 50 to 80% by weight of boric acid or borate, calculated as $H_3BO_3$ based on the total weight of the complex.

10. A process according to claim 1 wherein the concentration of the complex in the aqueous solution of coating material brought into contact with the percarbonate particles is at least 15% by weight.

11. A process according to claim 1 wherein the coating material additionally comprises a neutral alkali metal or ammonium salt.

12. A process according to claim 1 wherein the coating material is used in a quantity corresponding to 0.5 to 20% by weight, based on the weight of the coated alkali metal percarbonate.

13. A process according to claim 12 wherein the coating material comprises at least 1% w/w of said complex, calculated as $HBO_3$.

14. A process according to claim 1 wherein coating is carried out by spraying the aqueous solution of the coating material onto the percarbonate particles.

15. A process according to claim 14 wherein the percarbonate particles are agitated in a fluid bed during coating.

16. A process according to claim 15 wherein the temperature of the fluid bed is 30° to 95° C.

17. Process according to claim 14 wherein the percarbonate particles are coated with the coating solution in a mixer and then dried in a fluid bed.

18. Process according to claim 17 wherein the temperature in the mixer is from 10° to 60° C. and wherein the temperature of the fluid bed is from 50° to 90°.

19. Coated alkali metal percarbonate particles obtained by a process according to claim 4, 10, 14, 15, 16, 17 or 18.

20. Particulate alkali metal percarbonate having improved stability by coating with an effective amount of a boric acid or borate containing coating material, wherein the coating material comprises a complex of boric acid or a borate with an organic diol, a polyol, a hydroxycarboxylic acid, or a water soluble salt of a hydroxycarboxylic acid.

21. A product according to claim 20 wherein the alkali metal percarbonate comprises sodium percarbonate.

22. A product according to claim 20, wherein the complex is formed from a boric acid.

23. A product according to claim 20, wherein the complex is formed from borax.

24. A product according to claim 20, wherein the complex is formed from an aliphatic hydroxycarboxylic acid or soluble salt thereof.

25. A product according to claim 24 wherein the aliphatic hydroxycarboxylic acid or salt thereof employed to form the complex is selected from citric acid, tartaric acid, gluconic acid, saccharic acid and lactobionic acid and the alkali metal salts thereof.

26. A product according to claim 25 wherein the complex is formed from orthoboric acid and sodium citrate or sodium tartrate.

27. A product according to claim 25, wherein the complex contains 50 to 80% by weight of boric acid or borate, calculated as $H_3BO_3$ based on the total weight of the complex.

28. A product according to claim 25 wherein the complex is formed from boric acid and an hydroxycarboxylic acid and/or a soluble salt thereof.

29. A product according to claim 20, wherein the coating material additionally comprises a neutral alkali metal or ammonium salt.

30. A product according to claim 20, wherein the amount of the coating is 0.5 to 20% by weight, based on the weight of the coated alkali metal percarbonate.

31. A product according to claim 30, wherein the coating comprises at least 1% w/w of said complex, calculated as $HBO_3$.

32. A washing or bleaching composition containing at least one washing agent and a coated particulate alkali metal percarbonate having improved stability by being coated with an effective amount of a boric acid or borate containing coating material, wherein the coating material comprises a complex of boric acid or a borate with an organic diol, a polyol, a hydroxycarboxylic acid, or a water soluble salt of a hydroxycarboxylic acid.

33. A composition according to claim 32, wherein the alkali metal percarbonate comprises sodium percarbonate.

34. A composition according to claim 32, wherein the complex is formed from a boric acid.

35. A composition according to claim 32, wherein the complex is formed from borax.

36. A composition according to claim 32, wherein the complex is formed from an aliphatic hydroxycarboxylic acid or soluble salt thereof.

37. A composition according to claim 36, wherein the aliphatic hydroxycarboxylic acid or salt thereof employed to form the complex is selected from citric acid, tartaric acid, gluconic acid, saccharic acid and lactobionic acid and the alkali metal salts thereof.

38. A composition according to claim 37, wherein the complex is formed from orthoboric acid and sodium citrate or sodium tartrate.

39. A composition according to claim 32, wherein the complex contains 50 to 80% by weight of boric acid or borate, calculated as $H_3BO_3$ based on the total weight of the complex.

40. A composition according to claim 32, wherein the coating additionally comprises a neutral alkali metal or ammonium salt.

41. A composition according to claim 32, wherein the amount of the coating is 0.5 to 20% by weight, based on the weight of the coated alkali metal percarbonate.

42. A composition according to claim 41, wherein the coating comprises at least 1% w/w of said complex, calculated as $HBO_3$.

* * * * *